INVENTORS:
Edward Ernest Tully
Richard Gleave Norris

July 4, 1950  E. E. TULLY ET AL  2,513,435
LIQUID HEATING APPARATUS
Filed June 18, 1948  3 Sheets-Sheet 2
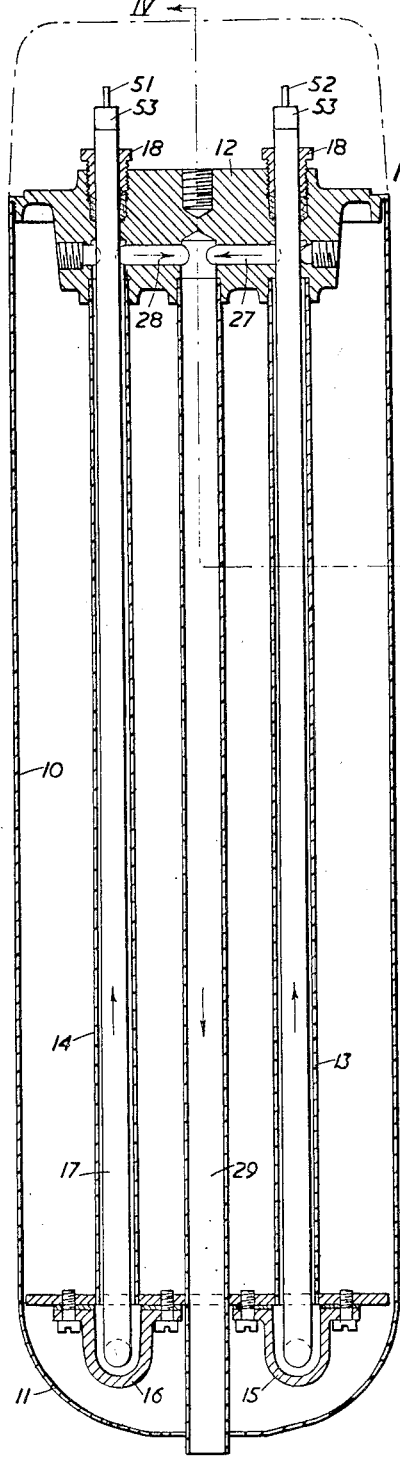
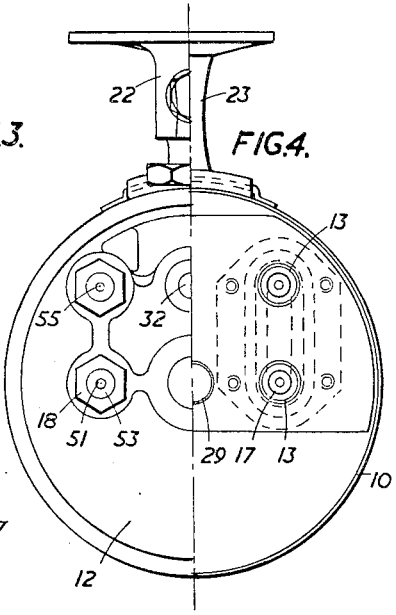
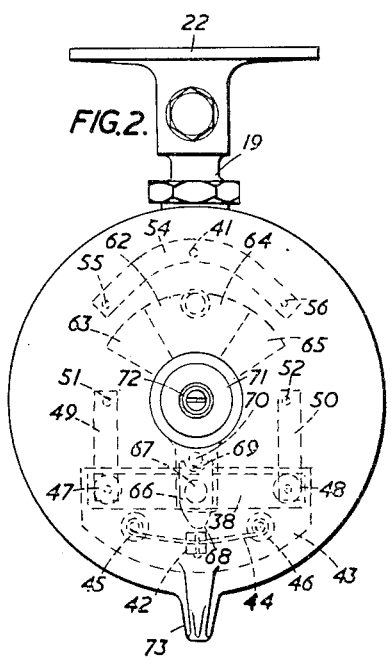
INVENTORS
E. E. Tully & R. G. Norris
BY
Their Agent Patented July 4, 1950

2,513,435

UNITED STATES PATENT OFFICE 2,513,435

LIQUID HEATING APPARATUS

Edward Ernest Tully, Bebington, and Richard Gleave Norris, Huyton, near Liverpool, England, assignors to Hotentot Industries Limited, Liverpool, England, a British company Application June 18, 1948, Serial No. 33,874
In Great Britain July 11, 1947

6 Claims. (Cl. 219—39)

This invention relates to liquid heating apparatus.

One object of this invention is to provide an improved liquid and heating medium control means for liquid heating apparatus.

Another object is to provide an efficient, robust, compact, yet easily and relatively cheaply constructed electrically operated water heater of the kind comprising at least one tubular member housing an electric heating element of the immersion type spaced a small distance from the interior wall of said tubular member or members, and wherein water to be heated enters at one end of the tubular member and flows to an outlet at the other end of said member via the space between the heating element and the interior wall of the tubular member, the water flowing through the heater in the form of a relatively thin film so that it is very rapidly and economically heated to produce very hot or boiling water at the outlet.

A further object is to provide simple means ensuring the optional flow of hot water at at least two different temperatures, such as water at boiling point and at a somewhat lower temperature. It is also desirable to interlink the water control means and the switch control for the heating medium so as to avoid the consequential damage arising from the heating means being turned on when the water supply is cut off.

According to the present invention the operating members of a liquid control valve and a heating medium control of a liquid heating apparatus are enclosed within a movable cover member for the apparatus which cover member carries means for engaging the controls whereby movement of the cover member effects operation of the controls.

Further by the present invention the engaging means on the movable cover are so formed that actuation of the heating medium control to energise the heat supply, is accompanied by opening of the liquid control valve, thereby avoiding heating when the water supply through the heater is turned off.

Conveniently the inlet to and outlet from the tubular member are arranged adjacent one another and are connected at the top of the apparatus to a distribution header which carries a liquid control valve and an electric switch for controlling the supply of electricity to the apparatus whilst the cover for the operating members at least of the valve and switch is rotatably supported on the header and is formed with or carries cam or the like means on its under face adapted to operate the valve and switch as the cover is rotated. Preferably the cam on the cover controlling the liquid supply is arranged to have two or more operative positions which give different degrees of opening of the liquid control valve and thus provide liquid at at least two different temperatures as desired.

The invention is more particularly described with reference to the accompanying drawings which illustrate a specific embodiment of the invention as applied to an electrically operated hot water heater for domestic and like purposes and in which:

Figure 2 is a plan view with the cover for the operating members in position and showing in dotted lines the position of the operating members consistent with closure of the valve and breaking of the electric circuit.

Figure 3 is a section on the line III—III of Figure 1, but with the cover and the operating members removed.

Figure 4 is a section on the lines IV—IV of Figure 3.

Figure 1:
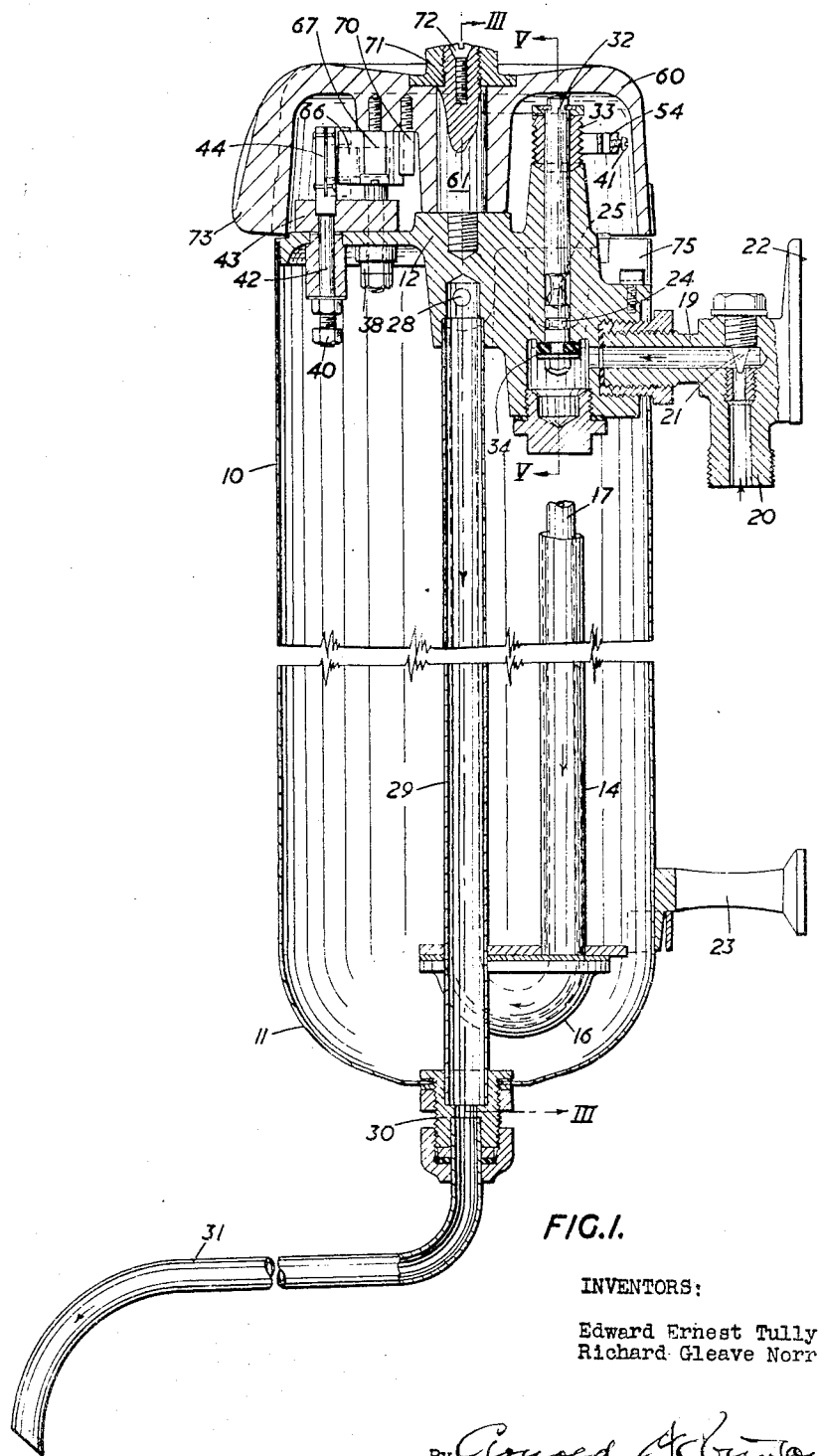
Figure 1 is a vertical section through a domestic heater and showing the control valve in its closed position.

In the construction illustrated, the heater comprises an outer casing 10 of cylindrical form and closed at its lower end by a dished closure plate 11 and at its upper end or top by a cast metal one-piece distribution header 12. Depending from the header by the extremities of their limbs are pairs of tubular members 13, 14, the two limbs of each pair being respectively connected together at their lower ends by small return-flow caps 15, 16. Each pair of tubular members houses an electric heating element 17 of the immersion type and of U-shaped form. The two ends of each element 17 pass up through glands 18 in the top distribution header and are adapted for connection to the electricity supply and the control switch to be hereinafter described.

The upper distribution header 12 has an adaptor for the reception of a screwed inlet connection 19 which is adapted for connection to the water supply at 20 and has a needle type restrictor valve 21 to compensate for varying pressures of water supply. This connection forms part of a bracket 22 by which the heater at its upper end is mounted on a wall or other support, a second bracket at 23 forming a support at the lower end. The water inlet 19 communicates via a water control valve 24 embodied in the header, with transverse inlet passageways 25, 26 in the header the ends of which communicate respectively with the inlet ends of the two pairs of tubular members 13, 14. The distribution header also has transverse outlet passageways 27, 28, the ends of which communicate respectively with the outlet ends of the two pairs of tubular members 13, 14. The outlet passageways 27, 28 are also connected to a discharge pipe 29 for the heated water, this pipe passing down the centre of the casing and having an outlet union 30 at its lower end which also serves to secure it to the lower dished closure plate 11 and to an outlet pipe 31.

The water control valve 24 is of the plunger type, having an integral plunger or operating stem 32 which projects through a resilient gland 33 which is retained on the stem by a washer 36. The valve is normally urged upwardly, to bring a washer 34 against a seating 35 to close the valve, by means of the water pressure in the inlet connection 19. The lower end of the valve 24 immediately above the washer 34 has a groove 37, of gradually increasing section in a direction away from the washer, formed therein so as to vary the cross sectional area of the valve port with longitudinal displacement of the spindle 32.

Turning to the electric control for the heating elements 17, the mains supply terminals feeding through a supply line which enters the heater through an opening 75 are indicated at 40, 41, the former being at the base of a conductor 42 which passes upwardly through the header casting 12 and an insulator 43. The upper end of the conductor 42 has secured thereto a metallic strip 44 carrying at its ends a pair of roller contacts 45, 46. A cooperating pair of contacts 47, 48 interconnected by a bus bar 38 are respectively mounted at the ends of bus bars 49, 50 which in turn are connected to terminals 51, 52 on one limb of each of the U-shaped heater elements 17 and are supported on insulators 53 at the upper ends of said elements. The other mains terminal 41 is on an arcuate bus bar 54 the ends of which are connected with terminals 55, 56, on the ends of the other limbs of the U-shaped heater elements 17.

It will thus be seen that in order to heat the elements 17 all that is necessary is to connect either the contacts 45 and 47 or the contacts 46 and 48 of the electric control mechanism.

The operating plunger 32 of the water control valve 24 and an actuating mechanism of the electric switch are enclosed within a regulating cover 60 rotatably mounted on a centrally located stem or boss 61 projecting up from the distribution header 12. This regulating cover is preferably a plastic moulding, its diameter being substantially the same as that of the header 12 on which it rotates and the cylindrical outer casing 10 of the heater, so that the whole appearance is pleasing and compact from top to bottom.

The underface of the top of the regulating cover is formed with ramp and raised segments 62, 63, respectively which are so arranged that as the cover 60 is rotated in one direction the underface bears down on the valve plunger 32 and causes this to gradually open the water control valve and then to maintain it in an open position, whilst ramp and raised surfaces 64, 65, which respectively have a different incline and total raise as compared with the ramp 62 and raised segment 63, function similarly but to a different degree when the cover 60 is rotated in the opposite direction.

The control switch for bridging the contacts 45 and 47 or 46 and 48 consists of a blade 66 which is pivotally mounted at 67 to the cover 60 and has a curved or nose portion 68 at one end and a recessed portion 69 at the other. A pin 70 screw threaded into the cover is located in the recess of the blade and it will be seen that by virtue of the clearance between the pin and the wall of the recess, the blade operates with a limited amount of lost motion and is slightly angularly displaced about its own pivot when overriding a contact 45 or 46 whereupon it bridges the appropriate contact 45 or 46 and its cooperating contact with a snap action to establish the electric circuit.

It will be appreciated that the combined arrangement of valve and switch is such that the blade 66 does not bridge the contacts 45 and 47 or 46 and 48 until after the plunger 32 has been depressed to open the valve 24.

It will also be appreciated that more than one pair of contacts may be provided on opposite sides of the mid-position of the blade to ensure that the heater may be used with different voltages of electric supply.

The rotatable regulating cover 60 is held on its supporting boss or stem 61 by a nut 71 having a fine thread and a milled periphery, which nut is screwed on to a threaded and narrow upper end of the boss or stem of the header, and is locked in position thereon by a screw 72, which operates to expand slightly the upper end of the boss in accordance with its degree of insertion therein. By loosening or tightening the nut 71 a degree of slackness is introduced into the mounting of the cover 60 which varies the height of the segmental raised underfaces 63, 65 of the cover with respect to the top of the valve plunger 32, thus determining and varying the volume of water which passes through the heating system, and thereby providing easy means of adjustment to suit the varying pressures and voltages obtained on public services.

A pointer 73 is formed on the external periphery of the cover 60 whilst a zero and other marks are formed on the casing 10 in the region of the top thereof to indicate to the user the inoperative position of the cover and the direction and extent of angular displacement which is required in order to achieve the desired opening of the valve 24.

Figure 5:
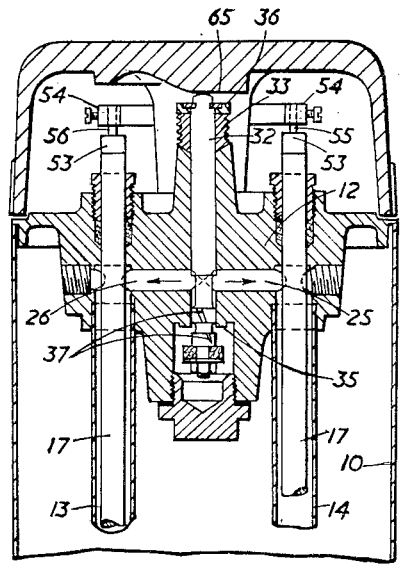
Figure 5 is a section on the lines V—V of Figure 1, but with the valve in its open position.
Figure 6:
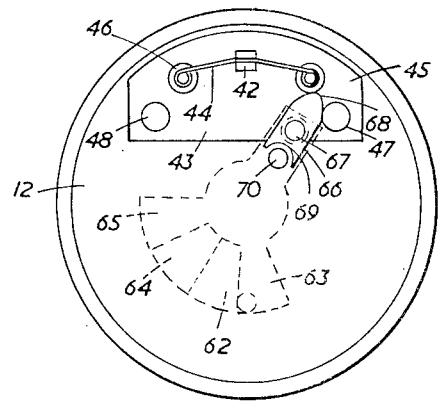
Figure 6 is a plan view showing the relative positions of the operating members consistent with one open position of the valve and closure of the corresponding contacts of the electric circuits.

The heater operates as follows:

When the heater is inoperative the position of the regulating cover 60 and its cam elements 62, 63, 64, 65 is such that the restrictor valve 24 is closed and the switch contacts 45, 47 and 46, 48 are open. If, say, boiling water is required the regulating cover 60 is given a partial turn in, say, an anti-clockwise direction. This immediately opens the water control valve 24 and then closes the switch contacts 46, 48 and water flows down the limb of one tubular member of each pair 13, 14 and up the other limb in the direction of the arrows shown in Figures 1, 3 and 5. In its flow through the tubular members the water is raised to boiling point by the heater elements 17 and is discharged via the discharge pipe 31. If hot water of a lower temperature than boiling is required the regulating cover is turned in the opposite direction by a predetermined amount and this closes the switch contacts 45, 47 and opens the flow restrictor valve 24 but to a greater extent than when the cover 60 is set for boiling water so that there is a greater flow rate through the tubular members 13, 14, and water at a correspondingly lower temperature is delivered by the discharge pipe 31.

At a loading of 3,000 watts it has been found that a heater according to the present invention can convert water at 52° F. to water at 212° F., i. e. a range of 160° F., in approximately 25 seconds and then can continuously deliver boiling water at 212° F. at the rate of 1 pint per 75 seconds.

It will be appreciated that with the present invention the cover itself constitutes the control for the water and heat supply and that no other operating mechanism is necessary for this purpose. If desired where there is more than one heating element the cover regulator may be arranged to operate a multiple switching arrangement to give water at different temperatures instead of or in addition to the adjustable water control system, and the motion may be in one direction instead of clockwise and anti-clockwise.

Whilst the invention has been described more particularly as applied to an electrically operated liquid heating apparatus it may also be applied to heaters wherein gas or oil burners constitute the heating medium.

Preferably all parts of the apparatus are made of non-corrosive metal or other material.

Having now particularly described and ascertained the nature of our said invention and in what manner the same is to be performed, we declare that what we claim is:

1. Liquid heating apparatus comprising a casing, a distribution header located in said casing and having a surface constituting a valve seat, at least one tubular member suspended from said header with both its inlet and its outlet located therein, a valve located in said header and displaceable bodily into and out of engagement with said seat for controlling the rate of liquid flow to and through said tubular member, at least one electric heater element in said tubular member, stationary elements of a switch of an electric circuit for said heater element which are supported on said header, and a dished cover of substantially the same cross sectional area as that of the casing and the header for shrouding the header and said stationary switch elements, which cover on manual rotation relatively to said casing and header being adapted both to operate said switch and to displace said valve.

2. Liquid heating apparatus as claimed in claim 1 and wherein the casing has an inlet for a liquid supply in the region of the distribution header and the header is concentric with both the casing and the cover and is bored to form both the inlet duct between said casing inlet and said tubular member and the outlet duct from said member.

3. Liquid heating apparatus as claimed in claim 1 and including ramp and raised segments on the under face of said cover member and a plunger associated with said valve and engaged by said ramp and raised segments on rotation of the cover member for longitudinal displacement in opening the valve.

4. Liquid heating apparatus as claimed in claim 1 and comprising a blade carried by said cover internally thereof and resiliently loaded roller contact switch elements in the electric circuit for the heater element, said blade in establishing the electric circuit having a lost motion and pivotal connection with the cover so as to enable it to complete the circuit with a snap action.

5. Liquid heating apparatus as claimed in claim 1 and comprising a dished cover which is rotatable in opposite directions for variably opening the valve so as to vary the volume of liquid passing through the header and thus the temperature of liquid delivered from the tubular member.

6. Liquid heating apparatus as claimed in claim 1 and including a central stem mounted on the distribution header about which stem the cover member is mounted for rotation, means being provided to adjust the cover member on said stem to vary the degree of opening of the valve independently of cover displacement.

EDWARD ERNEST TULLY.
RICHARD GLEAVE NORRIS.

REFERENCES CITED

The following references are of record in the file of this patent:

UNITED STATES PATENTS

| Number | Name | Date |
| --- | --- | --- |
| 891,455 | Bennett | June 23, 1908 |
| 1,221,106 | Stranszky | Apr. 3, 1917 |
| 1,357,287 | Hart | Nov. 2, 1920 |
| 1,569,485 | Hanson | Jan. 12, 1926 |
| 2,347,122 | Peet | Apr. 18, 1944 |